United States Patent
Singla et al.

(10) Patent No.: US 12,518,467 B2
(45) Date of Patent: Jan. 6, 2026

(54) METHOD AND SYSTEM FOR CREATING VIRTUAL SPACES

(71) Applicant: ADLOID TECHNOLOGIES PRIVATE LIMITED, New Delhi (IN)

(72) Inventors: Kanav Singla, New Delhi (IN);
Karthik Kanaujia, New Delhi (IN);
Sidharth Suresh, New Delhi (IN);
Ashish Dasari, New Delhi (IN)

(73) Assignee: ADLOID TECHNOLOGIES PRIVATE LIMITED, New Delhi (IN)

( * ) Notice: Subject to any disclaimer, the term of this patent is extended or adjusted under 35 U.S.C. 154(b) by 189 days.

(21) Appl. No.: 18/364,852

(22) Filed: Aug. 3, 2023

(65) Prior Publication Data
US 2024/0046546 A1 Feb. 8, 2024

(51) Int. Cl.
*G06T 15/04* (2011.01)
*G06T 7/13* (2017.01)
*G06T 17/20* (2006.01)

(52) U.S. Cl.
CPC .............. *G06T 15/04* (2013.01); *G06T 7/13* (2017.01); *G06T 17/20* (2013.01); *G06T 2200/04* (2013.01)

(58) Field of Classification Search
CPC ........... G06T 15/04; G06T 7/13; G06T 17/20; G06T 2200/04
See application file for complete search history.

(56) References Cited

U.S. PATENT DOCUMENTS

| | | | |
|---|---|---|---|
| 2017/0132837 A1* | 5/2017 | Iverson | G06T 17/10 |
| 2017/0287107 A1* | 10/2017 | Forutanpour | G06T 3/047 |
| 2018/0253886 A1* | 9/2018 | Hu | G06T 11/001 |
| 2018/0357804 A1* | 12/2018 | Forutanpour | G06T 11/60 |
| 2020/0250889 A1* | 8/2020 | Li | G06T 7/73 |

* cited by examiner

Primary Examiner — Michelle Chin (57) ABSTRACT

A server and method for rendering an interactive 3D environment by integrating a 360-degree image into a virtual space, for enhancing user experience is disclosed. The method involves receiving a comprehensive 360-degree image, which serves as the foundation for generating a 3D mesh structure using advanced surface and edge detection techniques. Said 3D mesh structure accurately represents the geometry of the 3D environment. The integration process continues with texture mapping the original 360-degree image onto the 3D mesh through the use of a UV map, resulting in a fully textured 3D mesh structure. To further enhance the immersive experience, additional maps are applied to the textured mesh, ultimately producing a complete 3D environment that can be rendered on various user devices. The proposed system offers a versatile and inclusive solution, ensuring an engaging and personalized 3D environment experience for users.

11 Claims, 9 Drawing Sheets

METHOD AND SYSTEM FOR CREATING VIRTUAL SPACES

TECHNICAL FIELD OF THE INVENTION

The present subject matter relates to computer vision technologies and, more particularly, to methods and systems for rendering a 3D environment of a 360 environment.

BACKGROUND OF THE INVENTION

In the ever-evolving landscape of commerce, companies have traditionally established their presence through physical brick-and-mortar establishments or ventured into the digital realm to market their goods and products directly to consumers (D2C brands). However, many D2C brands struggle to make a significant impact and leave a lasting impression on their target audience.

Although certain online platforms offer digital user experiences, the conversion rates for most brands remain low. A significant reason behind this disparity is that existing systems lack the capability to deliver personalized experiences, which has become a fundamental expectation of consumers. Recent studies have shown that approximately 51% of users desire personalized interactions with products and brands, indicating a strong desire for recognition and individual attention.

To address the challenges of effectively marketing goods and enhancing customer engagement, businesses have turned to the creation of virtual spaces within the immersive digital landscape. These virtual environments, often referred to as the "metaverse," offer fully immersive 3D experiences, where users interact through digital avatars. Unlike the constraints of the physical world, the metaverse allows for boundless creativity and flexibility, unencumbered by physical limitations. Various entities, including agencies and developers, approach the creation of these virtual spaces in different ways. Some opt for in-house development, while others leverage third-party software solutions to achieve their objectives.

Traditional methods for creating virtual environments have primarily centered around two approaches: the generation of 3D models of products and the creation of 360-degree image renders. While these methods have been utilized for showcasing products in digital settings, they come with inherent limitations. For instance, the process of crafting detailed and realistic 3D models often demands the expertise of skilled designers, leading to prolonged turnaround times and a considerable investment of manpower. On the other hand, 360-degree image renders may lack interactivity, failing to fully engage users beyond providing basic panoramic views.

In an attempt to create captivating virtual showrooms, some solutions have turned to virtual reality (VR) technology. However, the implementation of such platforms often involves complex coding, thereby restricting access to users without technical expertise.

Consequently, the existing methods and systems for creating virtual spaces encounter challenges in terms of turnaround times and resource requirements. Furthermore, achieving seamless interactions between 360-degree images and 3D models while upholding realism in 3D environments remains an ongoing challenge.

The demand for cross-platform solutions that can operate seamlessly across various computing devices, including desktops, mobile devices, and VR systems, has grown significantly. However, many existing solutions are limited to specific platforms, constraining their versatility and reach. Additionally, optimizing bandwidth usage has become essential to deliver high-quality 3D environments and 360-degree images without causing undue loading times or excessive strain on available bandwidth.

As a result, a pressing need exists for a novel system that surmounts the limitations of existing methods and offers an innovative application or methodology for creating virtual spaces that elevate user experiences.

SUMMARY OF THE INVENTION

The present subject matter discloses a server and a method for rendering a 3D environment. According to aspects of the present subject matter, a 360-degree image is integrated with a 3D environment of a virtual space for rendering to a plurality of client devices. This results in the creation of a compelling and improved interactive virtual experience for users which enhances the user experience.

According to an embodiment, a server for rendering the 3D environment is disclosed. The server comprises a processor, a receiving unit, a generating unit, a mapping unit, and a rendering unit. The receiving unit may be coupled to the processor and may be configured to receive a 360-degree image of a 360 environment. The generating unit may be configured to generate a 3D mesh structure based on the received 360-degree image and one or more of: surface detection techniques and edge detection techniques. The mapping unit may be coupled to the processor and may be configured to texture map the received 360-degree image onto the 3D mesh structure based on a UV map of the 3D mesh structure to obtain a textured 3D mesh structure. The mapping unit coupled to the processor may be further configured to apply one or more maps on the textured 3D mesh structure to obtain the 3D environment for rendering on a user device.

According to an embodiment, a method for rendering a 3D environment is disclosed. The method comprises receiving a 360-degree image of a 360 environment. The method further comprises generating a 3D mesh structure based on the received 360-degree image and one or more of: surface detection techniques and edge detection techniques, wherein the 3D mesh structure is representative of a geometry of the 3D environment. The method further comprises texture mapping the received 360-degree image onto the 3D mesh structure based on a UV map of the 3D mesh structure to obtain a textured 3D mesh structure. The method further comprises applying one or more maps on the textured 3D mesh structure to obtain a 3D environment corresponding to the 360 environment for rendering on a user device.

Embodiments of the present subject matter provides a seamless and platform-agnostic approach to creating interactive and personalized 3D environments by integration of 360-degree image into the 3D environment. The system is versatile and accessible, catering to users with varying levels of technical expertise and ensuring an engaging and dynamic user experience.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF INVENTION

It will be understood by those skilled in the art that the foregoing general description and the following detailed description are exemplary and explanatory of the disclosure and are not intended to be restrictive thereof. Throughout the patent specification, a convention employed is that in the appended drawings, like numerals denote like components.

Reference throughout this specification to "an embodiment", "another embodiment", "an implementation", "another implementation" or similar language means that a particular feature, structure, or characteristic described in connection with the embodiment is included in at least one embodiment of the present disclosure. Thus, appearances of the phrase "in an embodiment", "in another embodiment", "in one implementation", "in another implementation", and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures proceeded by "comprises . . . a" does not, without more constraints, preclude the existence of other devices or other sub-systems or other elements or other structures or additional devices or additional sub-systems or additional elements or additional structures. Further, the terms "a" and "an" herein do not denote a limitation of quantity, but rather denote the presence of at least one of the referenced items.

Unless otherwise defined, all technical and scientific terms used herein have the same meaning as commonly understood by one of ordinary skill in the art to which this disclosure belongs. The apparatus, system, and examples provided herein are illustrative only and not intended to be limiting.

Figure 1:
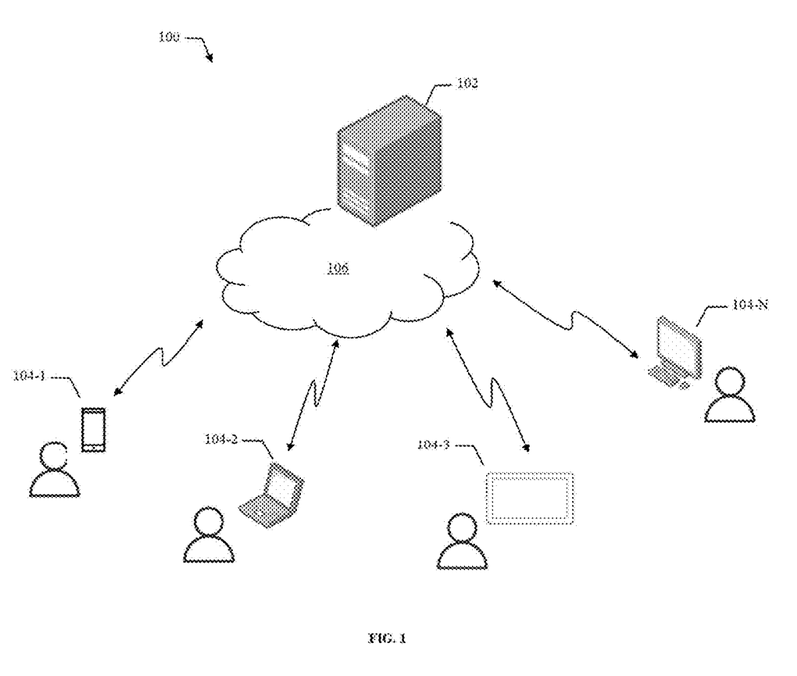
FIG. 1 illustrates an example network environment implementing a server for rendering a 3D environment of a 360 environment, according to one or more embodiments of the present subject matter.

FIG. 1 illustrates an example network environment 100 implementing a server 102 for rendering a 3D environment of a 360 environment, according to one or more embodiments of the present subject matter. Examples of the server 102 may include a content server, a server-grade machine, a gaming server, etc. The server 102 may be implemented, for example, by a developer or an enterprise offering 3D environment rendering services to a plurality of user devices 104. For the purposes of specification, the server 102 may be interchangeably used as render server 102.

In an example, the server 102 may be configured to receive 360 content, for example, 360-degree images of a real world 360 environment and create a 3D environment based thereon for rendering to the user devices 104. The 3D environment provides a rich experience to the users of the user devices 104 and enhances their user experience on the digital platform.

In an example, the 3D environment may be a digital representation of a three-dimensional space or virtual space. Examples of the environment may include, but are not limited to a Virtual Reality (VR) environment, an Augmented Reality (AR) environment, a Mixed Reality (MR) environment, and a 3D environment. Examples of Virtual Reality (VR) environment may include, but are not limited to VR games, Configurators, Virtual showrooms, VR training simulators, VR education, VR cinematic experiences, VR content viewers and editors. Examples of AR environment may include, but are not limited AR content viewers and editors, AR gaming, AR navigation and wayfinding, etc. Examples of MR environment may include, but are not limited to simulated training environments, spatial computing, etc.

Examples of the user devices 104-1 to 104-N may include a laptop, a smartphone, a desktop, a Virtual Reality (VR) device, a device supporting Augmented Reality (AR), and a device supporting Mixed Reality (MR), and the like. In FIG. 1, by way of example, a first user device 104-1 is depicted as smartphone, a second user device 104-2 is depicted as laptop, a third user device 104-3 is depicted as tablet supporting AR and Nth user device 104-N is depicted as a computer. In an example, the user devices 104-1 to 104-N may connect with the server 102 to avail the rendering services, using a network 106. The network 106 may be any of a wired network, a wireless network, and/or a combination of both. As an example, the user devices 104 may connect with the server 102 over the Internet.

As mentioned above, the server 102 may be configured to create a 3D environment based on 360 content, for example, 360-degree images. The server 102 may be configured to render an interactive and personalized 3D environment by integrating the 360-degree image that corresponds to a 360 environment. This integration of 360-degree images with the 3D environment creates a seamless and immersive experience for the users.

In an example, the server 102 may receive a 360-degree image of the 360 environment, for example, from an enterprise which is seeking to create a 3D experience for the users. The 360-degree image may be an image that captures a panoramic view that encompasses an entire virtual space or real-world location, i.e., covering a full 360-degree field of view. The 360-degree image may allow users to see in all directions, as if users may be standing at the centre of a scene and looking around.

The 360 environment may refer to a virtual or real-world space that may be captured and represented in a 360-degree format. In an example, the 360 environment, may be a digital representation of a scene or location captured from all directions, covering a full 360-degree view horizontally and often 180-degree view vertically. Examples of said environment includes but not limited to a physical location, a computer-generated 3D environment, or a captured scene for use in virtual space or other applications.

Post receipt of the 360-degree image, the server 102 may proceed to generate a 3D mesh structure by applying one or more surface detection techniques and edge detection techniques on the received 360-degree image. In an example, the 3D mesh structure is a collection of vertices, edges, and faces that define the shape and surface of a three-dimensional object.

In an embodiment, a storage coupled to or of the server 102 may include one or more 3D meshes of predefined geometric shapes which may be considered as a default option. Examples of default 3D meshes may include geometric shapes like a dome, cubes, spheres, cylinders, and cones. In said embodiment, the operation performed by the server 102 for generating the 3D mesh involves reconfiguring or refining the default 3D mesh based on the received 360-degree image. In this operation, adjustments or refinements are made to the default 3D mesh as per the 360-degree image in order to accurately align it with the visual characteristics and features depicted in the captured 360-degree image. The modifications and adjustments of the 3D mesh based on the specific visual attributes of the 360-degree image result in a more accurate and visually compelling representation of the virtual space, thus enhancing the overall immersive experience for users. Further, the integration with other 3D elements in a virtual space may be improved, thereby providing a more immersive and interactive experience for users. The other 3D elements may include but not limited to 3D Models, lighting, textures, interactivity, etc. In one example, the 3D models may include buildings, characters, furniture, vehicles, or any other objects that populate the virtual space. Further, in an example, the lighting includes various light sources, such as point lights, spotlights, or directional lights, that may be used to illuminate the virtual scene and cast shadows, enhancing the visual quality. Further, in an example, the textures may be the images applied to the surfaces of 3D models to give them realistic details and visual appeal. The textures may simulate materials like wood, metal, fabric, or anything that adds depth and complexity to the objects in the virtual space According to an aspect of the present subject matter, for generating the 3D mesh structure of the 360-degree image, the surface detection techniques and the edge detection techniques may be applied on the 360-degree image. By applying the aforementioned techniques, specific features and regions within the 360-degree image, including a portion corresponding to the floor of the 360 environment, may be identified with greater accuracy. Subsequently, based on these identified floor region and surfaces, the default 3D mesh may be appropriately modified.

For instance, the identified portion of the 360-degree image corresponding to the floor may be used to define the base of the 3D mesh structure. By determining the perimeter of the base based on this identified floor portion, the foundation for the 3D mesh structure may be established. Subsequently, the 3D mesh structure may be generated using the defined base and the 360-degree image as references. The base may serve as a crucial reference point, aiding in the spatial positioning and orientation of the surrounding objects and surfaces within the 360 environment. The base may provide the necessary context for accurately integrating the 360-degree image into the 3D virtual space, ensuring a seamless and immersive experience for users. Accordingly, the default 3D mesh structure corresponding to the virtual space may be adjusted to the generated 3D mesh structure. With the updated 3D mesh structure, the creation of realistic and interactive virtual environments may be enabled, combining the panoramic view of the 360-degree image with 3D elements, and offering an engaging and dynamic experience for users.

Once the 3D mesh structure is get generated from a 360-degree image, the server 102 proceeds to perform UV mapping for accurately texture mapping the 360-degree image onto the 3D mesh structure. In this operation, a UV unwrapping of the 3D mesh structure may be performed to generate a UV map, where each vertex of the 3D mesh structure is assigned a UV coordinate, which corresponds to a specific position on the UV map. The UV coordinates may serve as a map that determines how the 360-dgree image may be applied or wrapped onto the 3D surface of the mesh structure.

Further, once the UV coordinates defined, the server 102 may texture map the 360-degree image onto the 3D mesh structure to obtain a textured 3D mesh structure. As the texture mapping process progresses, the 360-degree image may be applied to the 3D mesh structure, pixel by pixel. The UV coordinates for each vertex determine which part of the 360-degree image may be used for that specific point on the 3D mesh structure. Said process may be repeated for all vertices on the mesh structure, ensuring that the entire surface of the 3D mesh structure may be covered with the texture.

After the texture mapping is complete, the textured 3D mesh structure may acquire the visual appearance and details of the 360-degree image. The texture mapping may create visually appealing and realistic 3D environments, as the texture brings out the color, details, and surface characteristics of the captured 360-degree image, making the virtual space more immersive and engaging for users.

After the texture mapping, additional maps may be applied to the textured 3D mesh structure by the server 102 to enhance the realism and visual quality of the 3D environment during rendering on the user device 104. In certain embodiments, one or more maps may be used, such as light maps, color maps, and reflection maps. In the context of rendering the 3D environment, light maps may serve as an additional layer of texture applied to the textured 3D mesh structure. Said light maps may interact with the regular texture map, determining how light interacts with the objects within the virtual space. By using light maps, the rendering process may accurately simulate lighting effects, including shadows and ambient occlusion, creating a visually consistent and realistic scene.

Furthermore, reflection maps also may be applied during the rendering of the 3D environment as an additional texture layer on the textured 3D mesh structure. Said reflection maps simulate reflections on reflective surfaces of the virtual space/3D environment, such as water, glass, or shiny materials. By applying reflection maps, the 3D environment may appear to reflect the surrounding virtual space, providing the illusion of realistic reflections on the surface of said materials.

The integration of said additional maps, such as light maps and reflection maps, with the textured 3D mesh structure enhances the visual fidelity and realism of the rendered 3D environment on the user device. Said maps contribute to an immersive user experience, providing accurate lighting and reflection effects that make the virtual space more engaging and visually appealing.

In an embodiment of the present subject matter, the communication between the server 102 and the user device may be performed in textual data format. Specifically, the 360-degree image may be received by the server 102 as textual data, and subsequently, the server 104 may render the 3D environment in textual data format to be transmitted to the user device. One notable benefit of utilizing textual data includes the reduced data size as textual data representation is generally more compact compared to other data formats, such as binary or image formats. As a result, the overall data size of the transmitted 360-degree image and the rendered 3D environment is minimized. This reduction in data size may lead to optimization in bandwidth usage during data transmission and may also reduce the time taken for sending or receiving the 360-degree image over networks. Furthermore, textual data allows for secure communication and data handling. The textual data may easily be encrypted, ensuring data security and privacy during transmission or storage. By employing the encryption techniques, sensitive information within the textual data can be safeguarded against unauthorized access.

Furthermore, in an embodiment of the present subject matter, when the server 102 renders the 3D environment, the server 102 may save or encode the rendered 3D environment in a file format that may be widely supported and compatible across various operating systems. The use of a common file format ensures that the 3D environment can be easily accessed, opened, and displayed on different user devices, regardless of their operating system. Furthermore, the use of the common file format for providing the rendered 3D environment offers practical advantages in terms of cross-platform compatibility, distribution efficiency, user experience, and development simplicity. In an example, the enterprise or developer may define the common file format that may be widely supported and compatible across different platforms and operating systems and accordingly the server 102 may render and generate the 3D environment. Various platforms may be at least one of desktops, mobile devices, and VR systems, AR devices, gaming consoles, etc.

Figure 2:
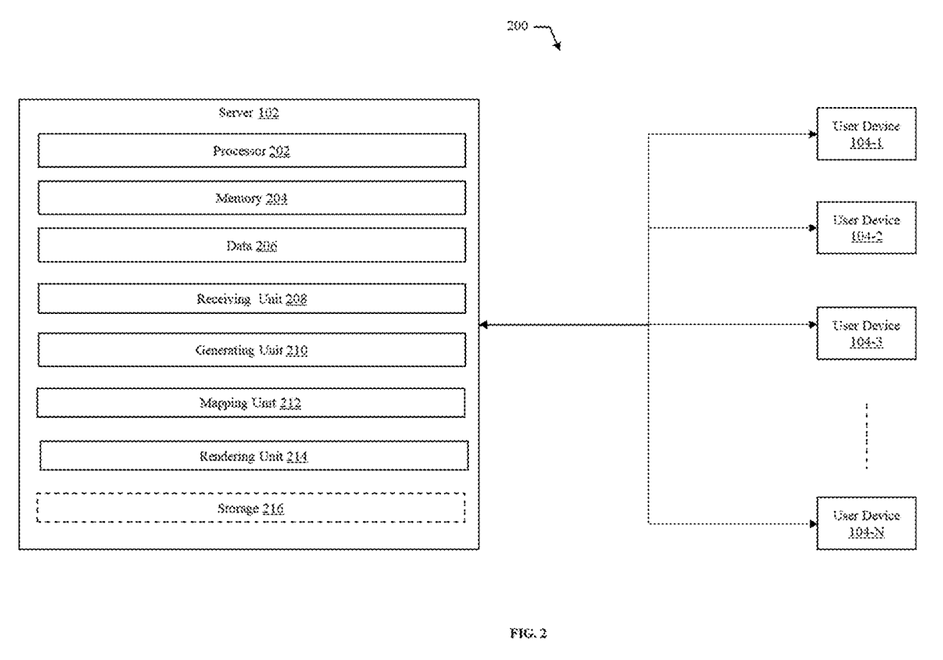
FIG. 2 illustrates a schematic block diagram of a server for rendering a 3D environment of a 360 environment, according to one or more embodiments of the present subject matter.

FIG. 2 illustrates a schematic block diagram 200 of the server 102, according to an example embodiment of the present subject matter. As shown, the server 102 may include a processor 202, memory 204, data 206, receiving unit 208, generating unit 210, mapping unit 212, rendering unit 214, and a storage 216.

In an example, the processor 202 may be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The memory 204 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The data 206 serves, amongst other things, as a repository for storing data processed, received, and generated by one or more of the processors 202. Writing further, in a non-limiting manner, one or more of the aforementioned components of the server 102 may send or receive data, for example, using one or more input/output ports and one or more user devices.

The receiving unit 208, the generating unit 210, the mapping unit 212, and the rendering unit 214, amongst other things, include routines, programs, objects, components, data structures, etc., which perform particular tasks or implement data types. Said units may also be implemented as, signal processor(s), state machine(s), logic circuitries, and/or any other device or component that manipulate signals based on operational instructions.

Further, the units can be implemented in hardware, instructions executed by a processing unit, or by a combination thereof. The processing unit can comprise a computer, a processor, such as the processor 202, a state machine, a logic array or any other suitable devices capable of processing instructions.

In another aspect of the present subject matter, the units may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In an example, the server 102 may include or may be communicatively coupled with a storage 212. The storage 212 may be either an internal storage or an external storage.

In an example, the server 102 may be configured to render a 3D environment to a user may seek access to a 3D environment using a user device 104. As may be understood, the server 103 may render this experience to a plurality of users using a plurality of user devices 104-1, 104-2, 104-3 . . . , 104-N, respectively. Examples of the 3D environment may include, a Virtual Reality (VR) environment, an Augmented Reality (AR) environment, a Mixed Reality (MR) environment, and a 3D environment, etc.

In an example, the 3D environment being rendered to the user devices 104 is created by the server 102 based on a 360 content, such as a 360-degree image corresponding to a 360 environment, such as a showroom, etc. According to the embodiments of the present subject matter, the server 102 may be configured to render an interactive and personalized 3D environment by integrating 360-degree images.

In operation, the receiving unit 208, coupled to the processor 202, may be configured receive a 360-degree image of a 360 environment. The 360-degree image may be a panoramic view that covers a full 360-degree horizontal field of view, capturing the entire surroundings from a central point. On receiving the 360 image, the server 102 may generate the 3D mesh structure in order to adjust or refine the default 3D mesh structure to align the default structure with the visual characteristics and features depicted in the captured 360-degree image.

For instance, the generating unit 210 may be configured to generate the 3D mesh structure based on the received 360-degree image by applying one or more surface detection techniques and edge detection techniques. The 3D mesh structure is representative of a geometry of the 3D environment. In an embodiment, the generating unit 210 may receive the 360-degree image as input. Subsequently, the generating unit 210 may use surface detection technique to analyze the 360-degree image and identify surfaces within the 360-degree environment. In an example, the surface detection techniques may recognize and delineate different surfaces, such as walls, floors, objects, and other elements in the scene. Furthermore, the generating unit 210 may employs edge detection technique to identify the boundaries or edges of objects and surfaces within the 360-degree image.

More particularly, in an example, the generating unit 210 may identify a portion in the received 360-degree image which corresponds to a floor of the 360 environment by applying the surface detection techniques and edge detection techniques on the received 360-degree image, as explained above. Upon identification of the portion which corresponds to the floor, the generating unit 210 may define a base of the 3D mesh structure by determining a perimeter thereof. Furthermore, the generating unit 210 may use the base as a reference point to establish the spatial positioning and orientation of the surrounding objects and surfaces within the 360 environment. In an example, the 3D mesh structure may be indicative of spatial layout and appearance of a virtual space captured in the 360-degree image.

Once the 3D mesh is generated, the mapping unit 212 may be configured to texture map the received 360-degree image onto the 3D mesh structure based on a UV map of the 3D mesh structure to obtain a textured 3D mesh structure. In an example, texture mapping may be used to apply textures or 360-degree images onto 3D mesh structure to add visual details and realism to the objects in the virtual space. In an embodiment, the mapping unit 212 may use the received 360-degree image as a texture. Said image may serve as the visual content that may be mapped onto the created 3D mesh structure using the UV map to add surface detail and appearance.

In operation, the mapping unit 212 may perform a UV unwrapping of the 3D mesh structure to generate the UV map, where each vertex of the 3D mesh structure is assigned a UV coordinate, which corresponds to a specific position on the UV map. Each vertex in the 3D mesh structure may have a corresponding UV coordinate, which may act as a mapping guide for the texture mapping process. The UV coordinates may represent the specific locations on the UV map where the texture may be applied to the 3D surfaces.

Based on these corresponding UV coordinates, the mapping unit 212 may perform the texture mapping of the 360-degree image onto the 3D mesh. In this operation, the UV coordinates may be used as references to accurately place and align the texture from the 360-degree image onto the corresponding surfaces of the 3D mesh structure to obtain the textured 3D mesh structure.

Once the textured 3D mesh is prepared, the mapping unit 212 may be configured to apply one or more maps on the textured 3D mesh structure to obtain the 3D environment for rendering one a user device. In an embodiment, the one or more maps may include light maps, colour maps, and reflection maps. The Application of the aforementioned maps adds further visual effects and enhances the realism of the 3D environment making it more visually appealing, realistic, and immersive.

Based on the above operations, the final scene may be a complete 3D environment for rendering onto the user device. The rendered 3D environment may now include the visual details from the original 360-degree image, accurate texture mapping, and additional visual effects from the applied maps. Said maps may be added in real time while rendering the 3D environment to the user device to make the 360-degree image interactive with the 3D environment.

Further, in an embodiment, the receiving unit 208 coupled to the processor 202 may be configured to receive the 360-degree image as a textual data wherein a rendering unit 214 coupled to the processor 202 is configured to render the 3D environment in textual data format to a user device. Unlike in the convention solution of receiving the 360-degree image in a traditional image format (e.g., JPEG or PNG), the receiving unit 208 of the present subject matter interprets and treats the image data as textual data. The 360-degree image may be represented as a string of characters or a series of data in a text-based format. Further, according to said embodiment, with the help of the rendering unit 214, the processor 202 takes the textual representation of the 360-degree image and converts it into a textual data format that represents the 3D environment. Said data may be displayed on the user device 104 that can interpret and present text-based information.

Further, in an embodiment, the rendering unit 214 may be coupled to the processor 202 may be further configured to provide the rendered 3D environment to a plurality of user devices having different operating systems in a common file format. As explained earlier, the user may have different operating systems installed. For example, some users may have devices running on Windows, while others may use macOS, Linux, Android, iOS, or other operating systems. Accordingly, common file format may be used by the rendering unit 212 to output the rendered 3D environment that is compatible with above said different platforms. Advantage of using common file format ensures that users on various devices can access and view the 3D environment without any compatibility issues.

Figure 3:
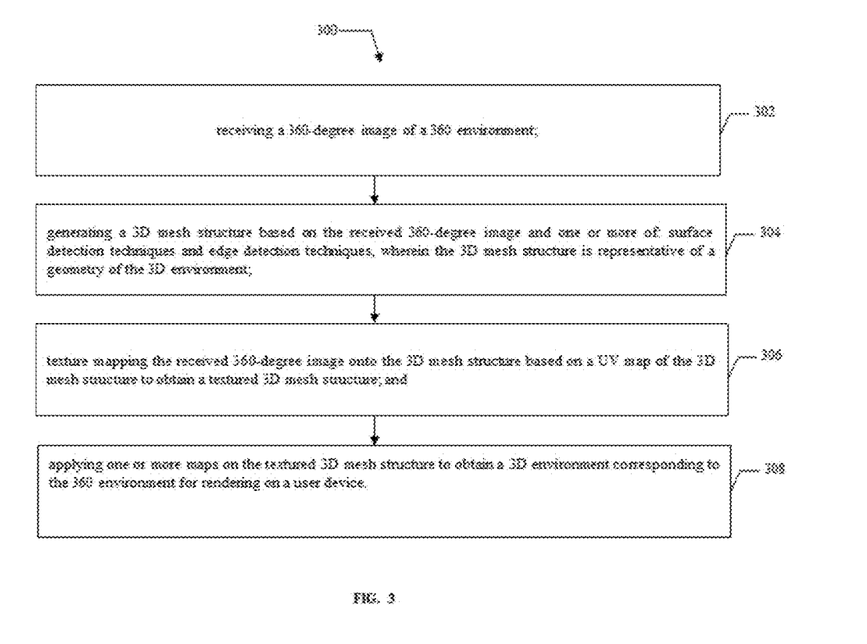
FIG. 3 illustrates a flowchart of a method of rendering a 3D environment of a 360 environment, according to one or more embodiments of the present subject matter.

FIG. 3A illustrates a method 300 of rendering a 3D environment of a 360 environment according to one or more embodiments of the present subject matter. In an example, the method 300 may be implemented by the render server 102.

At step 302, the method 300 includes receiving, by a render server 102, a 360-degree image of a 360 environment. In this step, the render server 102 is presented with a 360-degree image, which serves as the gateway to the virtual or real-world 360 environment. The 360-degree image is a panoramic representation, capturing an all-encompassing view of the entire spatial setting from every possible direction. This comprehensive visual data provides a complete and immersive portrayal of the 360 environment, encapsulating its spatial layout, objects, structures, and scenery.

The 360-degree image can be sourced from various input devices, such as specialized cameras capable of capturing full panoramic views or other imaging systems adept at producing seamless 360-degree visuals. Alternatively, the image may be transmitted from user devices, enterprises, or external data sources seeking to create a 3D environment for a myriad of applications, including Virtual Reality (VR), Augmented Reality (AR), Mixed Reality (MR), and other interactive platforms.

At step 304, the method 300 includes generating a 3D mesh structure based on the received 360-degree image and one or more of: surface detection techniques and edge detection techniques. Upon receipt of the 360-degree image in Step 302, the render server 102 initiates the process of creating a 3D mesh structure, a fundamental framework for rendering the immersive 3D environment. In an embodiment, the 3D mesh structure may be representative of a geometry of the 3D environment. Leveraging the application of surface detection techniques and edge detection techniques, the server may analyze the visual data contained within the 360-degree image. The surface detection techniques are employed to discern and identify specific features, surfaces, and objects existing within the 360 environment. Through this analysis, the server gains insights into the spatial boundaries, shapes, and characteristics of the elements captured in the panoramic view.

Simultaneously, the render server 102 engages edge detection techniques to identify and extract the defining edges and boundaries that demarcate different surfaces and objects within the 360-degree image. These techniques allow for precise recognition of spatial transitions, contributing to the seamless integration of elements within the 3D environment.

At step 306, the method 300 includes performing texture mapping of the received 360-degree image onto the 3D mesh structure based on a UV map of the 3D mesh structure to obtain a textured 3D mesh structure. With the 3D mesh structure generated in Step 304, the render server 102 proceeds with the texture mapping process. Texture mapping involves precisely applying the 360-degree image onto the 3D mesh surface, giving it the visual appearance and details captured in the original image. To achieve accurate and seamless texture application, the render server 102 uses a UV map of the 3D mesh structure as a guide. The UV map maps each vertex of the 3D mesh to a corresponding position on a 2D plane, ensuring a one-to-one relationship between the 3D mesh and the 360-degree image.

By utilizing the UV map, the render server 102 may correctly positions and orients the texture elements from the 360-degree image onto the corresponding vertices of the 3D mesh. The result may be a textured 3D mesh structure that accurately represents the 360 environment in visual detail. In the final step, the render server 102 enhances the visual quality and realism of the textured 3D mesh structure by applying one or more additional maps. These maps include light maps, color maps, reflection maps, and other types of maps that contribute to simulating various lighting effects, shadows, reflections, and material properties within the 3D environment.

By integrating these additional maps, the render server 102 creates a fully realized 3D environment that closely corresponds to the original 360 environment captured in the 360-degree image. This enhanced 3D environment is now ready for rendering on a user device, be it a laptop, smartphone, virtual reality device, augmented reality device, or any other compatible platform.

At step 308, the method 300 includes applying one or more maps on the textured 3D mesh structure to obtain a 3D environment corresponding to the 360 environment for rendering on a user device.

In an embodiment, the method 300 includes receiving of 360-degree image as a textual data. Further, the method 300 includes transmitting the rendered 3D environment in textual data format to the user device.

In another embodiment, the method 300 includes providing the rendered 3D environment to a plurality of user devices having different operating systems in a common file format.

Figure 4:
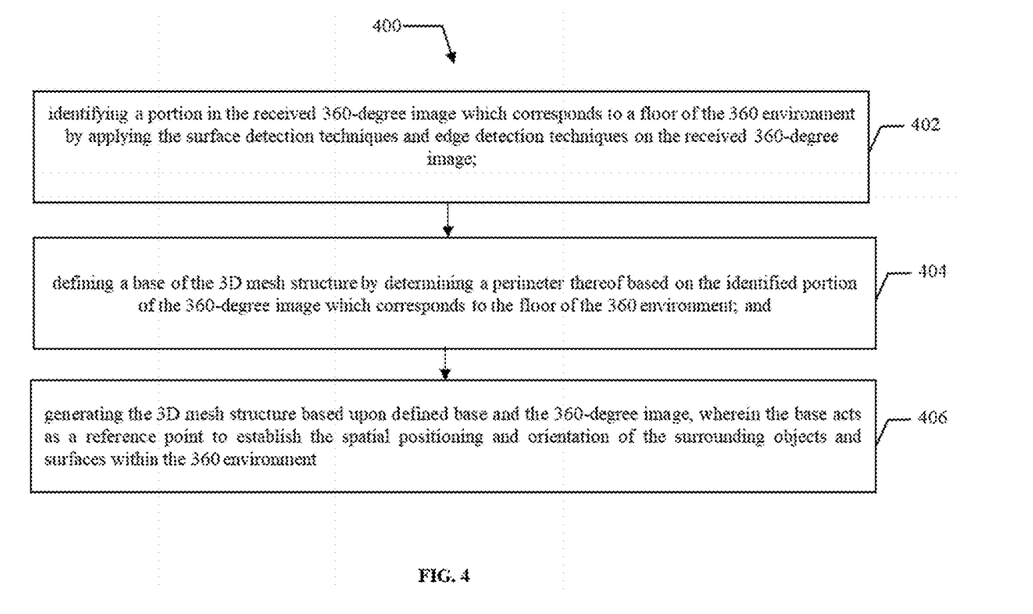
FIG. 4 illustrates a flowchart for generating a 3D mesh structure based upon floor detection and base detection of a 360 environment.

FIG. 4 illustrates a method 400 for generating a 3D mesh structure a 360 environment based upon floor detection and base detection of said environment, according to one or more embodiments of the present subject matter. In an example, the method 400 may be implemented by the render server 102.

At step 402, the method 400 includes identifying a portion in the received 360-degree image which corresponds to a floor of the 360 environment by applying the surface detection techniques and edge detection techniques on the received 360-degree image. In this step, the render server 102 processes the 360-degree image received from the user or enterprise to detect the floor region within the environment. The surface detection and edge detection techniques are advanced image processing algorithms that analyze the pixel data in the 360-degree image to identify the specific portion that represents the floor or ground surface of the 360 environment. The surface detection techniques analyze the image to identify areas with consistent color, texture, and depth characteristics, typically found in the floor regions of an environment. The surface detection techniques may use algorithms such as color segmentation and region growing to distinguish the floor from other objects in the image. Simultaneously, the edge detection techniques work to identify prominent edges and boundaries in the image. The edges represent sharp transitions in color or intensity and can help distinguish the floor's boundaries from other objects or walls present in the 360-degree image. By combining the results of surface detection and edge detection, the render server 102 accurately locate the floor region within the 360-degree image. The floor region encompasses the floor area that may serve as the foundation for the 3D mesh structure. The successful identification of the floor is important for generating a realistic and immersive 3D environment since it provides a reference point for positioning and aligning other 3D elements within the virtual space. Once the floor region is identified, the render server 102 proceeds to the next step, where the render server 102 may define the base of the 3D mesh structure based on this identified floor portion. The defined base will act as a reference point for establishing the spatial positioning and orientation of surrounding objects and surfaces within the 360 environment during the generation of the 3D mesh structure.

At step 404, the method 400 includes defining a base of the 3D mesh structure by determining a perimeter thereof based on the identified portion of the 360-degree image which corresponds to the floor of the 360 environment. In this step, the render server 102 proceeds to analyze the boundaries of the identified floor region within the 360-degree image. By monitoring the pixels that mark the edges of the floor area, the server 102 calculates the outermost points that encompass the floor's perimeter. Said points define the shape and size of the base, which directly influences the spatial layout and proportions of the resulting 3D environment. For example, if the floor region in the 360-degree image represents a circular area, the render server 102 will determine the centre of the circle and measure the distance from this centre to the outermost edge, effectively capturing the radius. Alternatively, if the floor region has a polygonal shape, the server will identify the vertices that outline the shape, thus determining the perimeter of the base. By accurately defining the base's perimeter, the render server 102 generates a precise 3D mesh structure that accurately represents the floor region captured in the 360-degree image. Said process ensures that the virtual space aligns with the real-world or virtual environment, maintaining visual consistency and coherence. Once the base's perimeter is determined, the render server 102 proceeds to the subsequent step, where the render server 102 generates the 3D mesh structure based on the defined base and the 360-degree image. The base, acting as a reference point, helps in accurately positioning and orienting the surrounding objects and surfaces within the 360 environment during the 3D mesh generation process, resulting in a seamless and immersive user experience.

At step 406, the method 400 includes generating the 3D mesh structure based upon defined base and the 360-degree image, where the base acts as a reference point to establish the spatial positioning and orientation of the surrounding objects and surfaces within the 360 environment. Using the defined base as a reference, the render server 102 generates the 3D mesh structure representing the 360-degree environment. The 360-degree image is integrated into this mesh structure, aligning the mesh with the visual characteristics of the captured environment. As a result, the 3D mesh accurately positions and orients surrounding objects and surfaces, ensuring that the 360 environment appears realistic and immersive to users.

Figure 5:
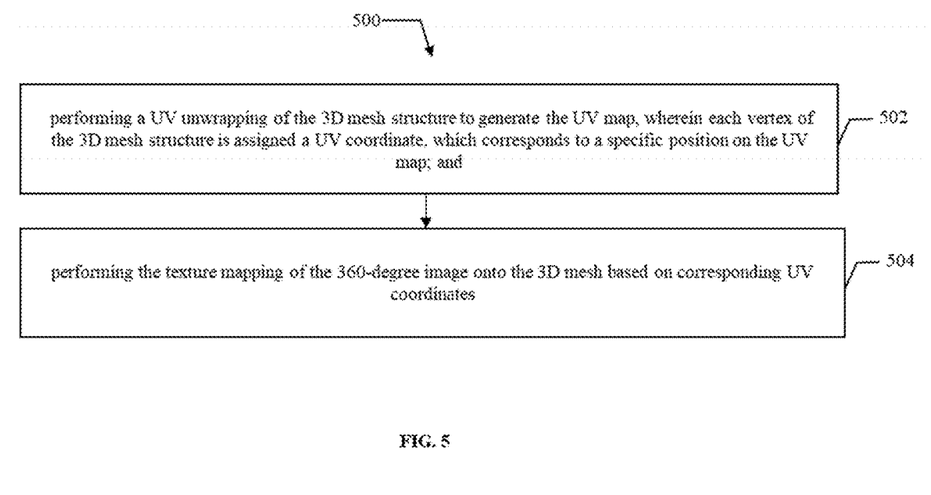
FIG. 5 illustrates a flow chart for texture mapping a 360-degree image onto a 3D mesh structure by generating a UV map of said structure, according to one or more embodiments of the present subject matter.

FIG. 5 illustrates a method 500 for texture mapping a 360-degree image onto a 3D mesh structure by generating a UV map of said structure, according to one or more embodiments of the present subject matter. In an example, the method 400 may be implemented by the render server 102.

At step 502, the method 500 includes performing a UV unwrapping of the 3D mesh structure to generate the UV map, wherein each vertex of the 3D mesh structure is assigned a UV coordinate, which corresponds to a specific position on the UV map. In this step, the render server 102 executes UV unwrapping, a fundamental process in computer graphics and 3D modeling, to create a UV map that acts as a bridge between the 3D mesh and a two-dimensional plane. UV unwrapping is essential for accurately applying 2D textures onto the 3D surface during the texture mapping process.

The UV unwrapping procedure involves transforming the 3D mesh into a 2D representation, known as the UV map. The UV map is essentially a flattened version of the 3D mesh, where each vertex of the 3D mesh is assigned a corresponding UV coordinate. These UV coordinates determine specific positions on the UV map and serve as a guide for accurately projecting the 3D surface onto the two-dimensional plane. The UV unwrapping process requires optimization algorithms to minimize distortion and stretch of the UV map, ensuring that the 2D textures applied during the texture mapping step align seamlessly with the 3D surface without distortion or visible seams. Once the UV unwrapping is completed, the UV map serves as a mapping reference, guiding the subsequent texture mapping operation. The UV coordinates assigned to each vertex of the 3D mesh provide the necessary information to accurately project the 360-degree image (or any other 2D texture) onto the 3D surface, ensuring a realistic and visually appealing 3D environment.

At step 504, the method 500 includes performing the texture mapping of the 360-degree image onto the 3D mesh based on corresponding UV coordinates. Having successfully completed the UV unwrapping process in Step 502, the render server 102 now proceeds with the texture mapping. Texture mapping is an operation in a rendering pipeline that involves applying the 360-degree image onto the 3D mesh surface with utmost accuracy and realism. In this step, the render server 102 utilizes the UV coordinates obtained during UV unwrapping as essential guidelines for precisely positioning and orienting the texture elements from the 360-degree image onto the corresponding vertices of the 3D mesh structure. The UV coordinates serve as a mapping reference that establishes a one-to-one relationship between the 3D mesh structure and the 360-degree image, ensuring that each point on the 3D surface correctly corresponds to the corresponding pixel on the 360-degree image. The texture mapping process involves traversing the UV map and mapping each UV coordinate to the corresponding pixel in the 360-degree image. For instance, if a UV coordinate points to a specific position on the UV map, the render server 102 fetches the color and texture information from the corresponding location on the 360-degree image and accurately projects it onto the corresponding vertex of the 3D mesh structure.

By applying the texture pixel by pixel, the render server 102 covers the entire 3D mesh surface with the visual details and characteristics of the 360-degree image. This integration of the image onto the 3D mesh structure ensures a seamless and visually coherent representation of the virtual environment, effectively simulating the appearance of the real-world or the virtual scene. During the texture mapping process, various techniques such as bilinear interpolation and mipmapping may be employed to ensure smooth and high-quality texture transitions on the 3D surface, enhancing the overall visual fidelity of the rendered environment.

Figure 6A:
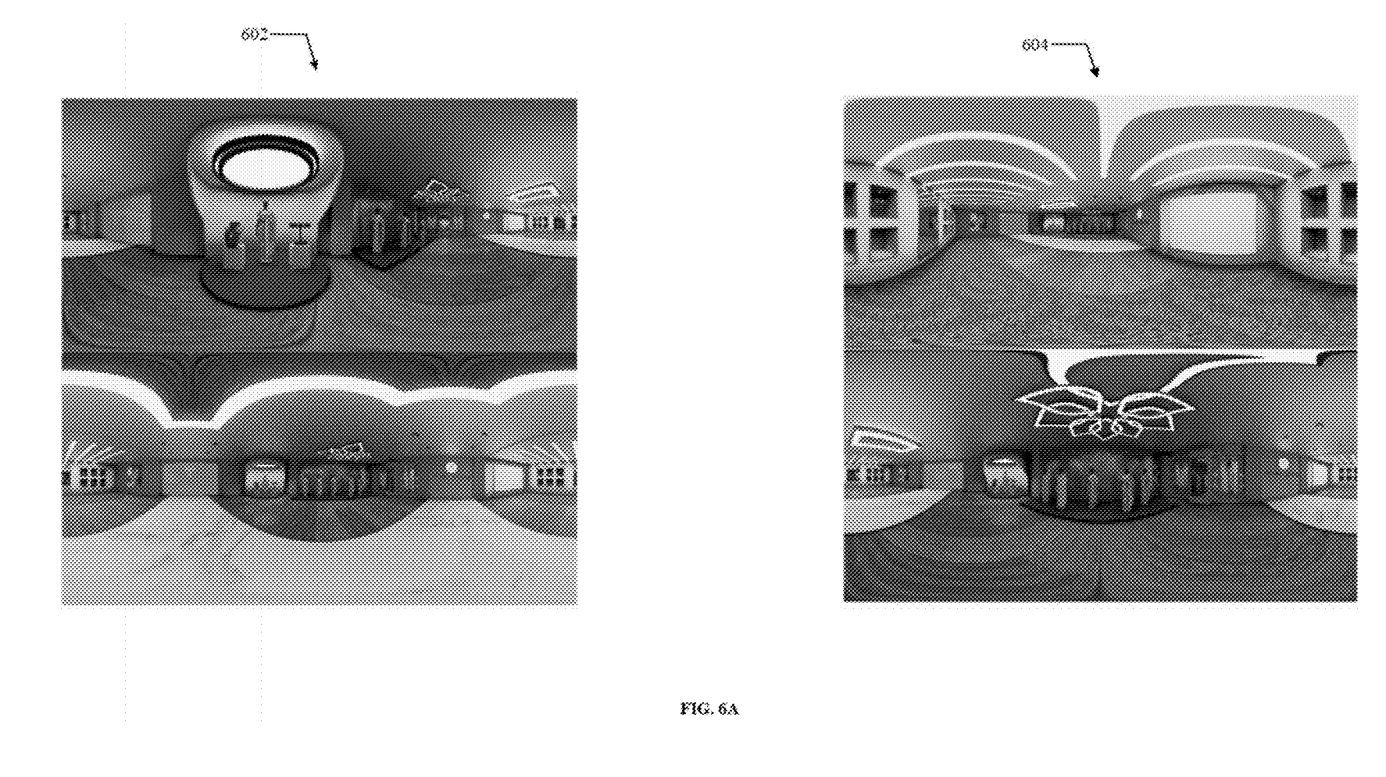
FIG. 6A-6D illustrates various stages of an example operation for integrating 360-degree images of a 360-environment with a 3D environment, according to one or more embodiments of the present subject matter.
Figure 6B:
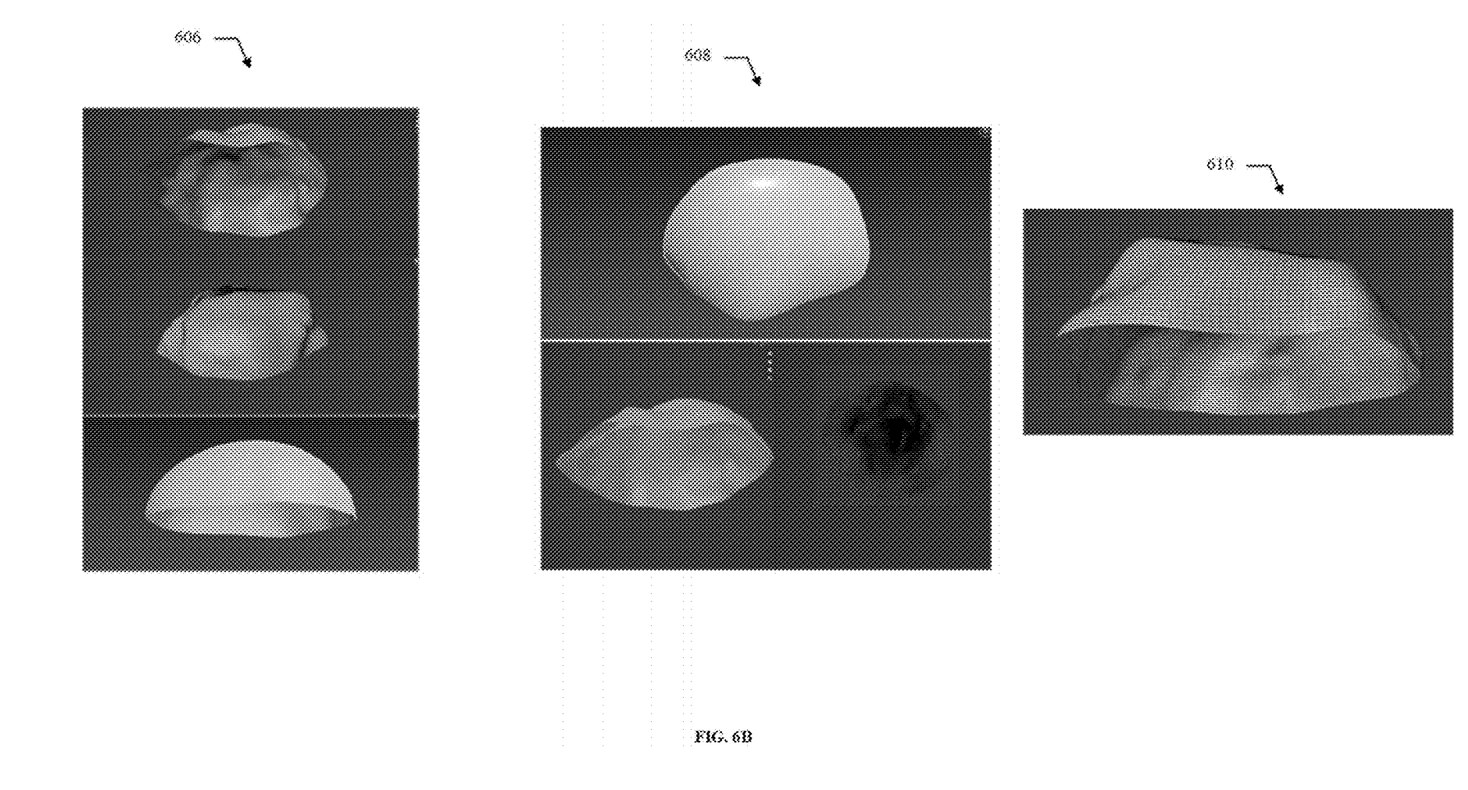

FIG. 6A-6D illustrates various stages of an example operation for integrating 360-degree images of a 360-environment with a 3D environment, according to one or more embodiments of the present subject matter. As illustrated in these figures, the 360 environment is a showroom. Referring to FIG. 6A, 360-degree images of the showroom are received by a render server 102. In said example, 602 and 604 illustrates 360-degree images of the showroom from different angles, as captured using, for example, a 360-degree camera. Referring to FIG. 6B, the render server 102 may generate one or more 3D mesh structures 606-610 based on the received 360-degree images 602-604. In an example, upon receipt of the 360-degree images 602 and 604, the render server 102 initiates the process of creating 3D mesh structures leveraging the application of surface detection techniques and edge detection technique.

Figure 6C:
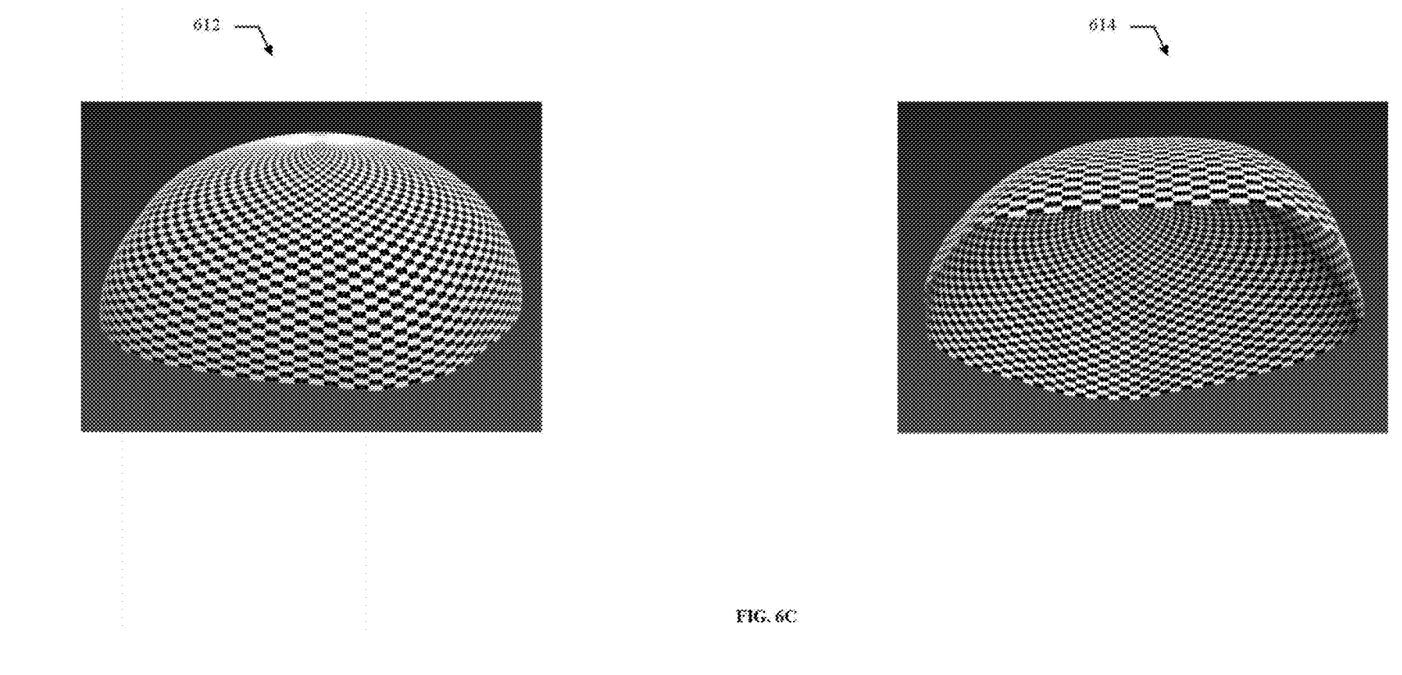
Figure 6D:
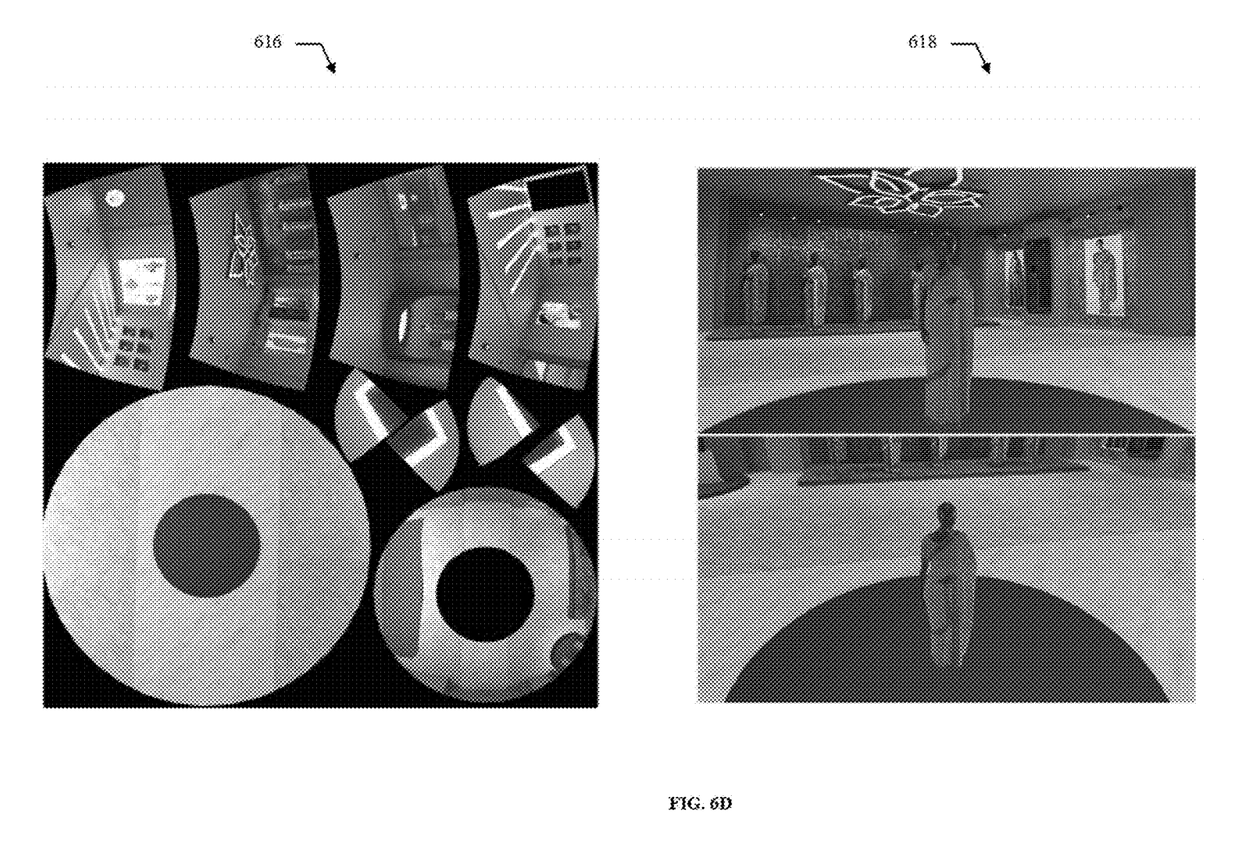

Referring to FIG. 6C, UV maps 612-614 based upon the 3D mesh structures 606-610 are illustrated. With the 3D mesh structures 606-610 generated in FIG. 6B, the render server 102 proceeds with the texture mapping process and uses UV maps 612-614 of the 3D mesh structures 606-610 as guide to perform the texture mapping. Referring to FIG. 6D, 616 illustrates texture maps of the 360 images 602 and 604. Further, an image of the 3D mesh structure with the texture map rendered onto it is illustrated in 618. After performing texture mapping of the received 360-degree images 602-604 onto the 3D mesh structures 606-610 based on a UV map 612-614 of the 3D mesh structures 606-610, a textured 3D mesh structure is obtained as illustrated in 618. Thus, the render server 102 creates a fully realized 3D environment that closely corresponds to the original showroom captured in the 360-degree images of the showroom. This enhanced 3D environment is now ready for rendering on a user device, such as a laptop, smartphone, virtual reality device, augmented reality device, or any other compatible platform.

The one or more advantages of the present subject matter includes but not limited to providing a cross-platform solution that utilizes a standard 3D file format, ensuring compatibility across various devices and system. Another advantage includes faster turnaround time (TAT), data security and privacy during transmission or storage, bandwidth optimization. Further, the present subject matter provides a seamless and platform-agnostic approach to creating interactive and personalized 3D environments by integration of 360- degree image into the 3D environment. The accurate and visually compelling representation of the virtual space created by the method and server of the present subject matter enhances the overall immersive experience for users.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the disclosure, any limitations arising on account of the same are not intended. As would be apparent to a person in the art, various working modifications may be made to the apparatus in order to implement the inventive concept as taught herein.

We claim:

1. A server for rendering a 3D environment of a 360 environment, wherein the server comprises:
   a processor;
   a receiving unit coupled to the processor, wherein the receiving unit is configured to receive a 360-degree image of a 360 environment;
   a generating unit coupled to the processor, wherein the generating unit is configured to generate a 3D mesh structure based on the received 360-degree image and one or more of: surface detection techniques and edge detection techniques, wherein the 3D mesh structure is representative of a geometry of the 3D environment;
   mapping unit coupled to the processor, wherein the mapping unit is configured to texture map the received 360-degree image onto the 3D mesh structure based on a UV map of the 3D mesh structure to obtain a textured 3D mesh structure; and
   the mapping unit coupled to the processor is further configured to apply one or more maps on the textured 3D mesh structure to obtain the 3D environment for rendering on a user device.

2. The server as claimed in claim 1, wherein the generating unit coupled to the processor is further configured to:
   identify a portion in the received 360-degree image which corresponds to a floor of the 360 environment by applying the surface detection techniques and edge detection techniques on the received 360-degree image;
   define a base of the 3D mesh structure by determining a perimeter thereof based on the identified portion of the 360-degree image which corresponds to the floor of the 360 environment; and
   generate the 3D mesh structure based upon defined base and the 360-degree image, wherein the base acts as a reference point to establish the spatial positioning and orientation of the surrounding objects and surfaces within the 360 environment.

3. The server as claimed in claim 1, wherein the mapping unit coupled to the processor is further configured to:
   perform a UV unwrapping of the 3D mesh structure to generate the UV map, wherein each vertex of the 3D mesh structure is assigned a UV coordinate, which corresponds to a specific position on the UV map;
   perform the texture mapping of the 360-degree image onto the 3D mesh based on corresponding UV coordinates.

4. The server as claimed in claim 1, wherein the receiving unit coupled to the processor is further configured to receive the 360-degree image as a textual data wherein a rendering unit coupled to the processor is configured to render the 3D environment in textual data format to a user device.

5. The server as claimed in claim 1, wherein the rendering unit coupled to the processor is further configured to provide the rendered 3D environment to a plurality of user devices having different operating systems in a common file format.

6. A method of rendering a 3D environment of a 360 environment, wherein the method comprises:
   receiving a 360-degree image of a 360 environment;
   generating a 3D mesh structure based on the received 360-degree image and one or more of: surface detection techniques and edge detection techniques, wherein the 3D mesh structure is representative of a geometry of the 3D environment;
   texture mapping the received 360-degree image onto the 3D mesh structure based on a UV map of the 3D mesh structure to obtain a textured 3D mesh structure; and
   applying one or more maps on the textured 3D mesh structure to obtain a 3D environment corresponding to the 360 environment for rendering on a user device.

7. The method as claimed in claim 6, wherein the one or more maps comprises at least one of: light maps, color maps, and reflection maps.

8. The method as claimed in claim 6, wherein generating the 3D mesh structure comprises:
   identifying a portion in the received 360-degree image which corresponds to a floor of the 360 environment by applying the surface detection techniques and edge detection techniques on the received 360-degree image;
   defining a base of the 3D mesh structure by determining a perimeter thereof based on the identified portion of the 360-degree image which corresponds to the floor of the 360 environment; and
   generating the 3D mesh structure based upon defined base and the 360-degree image, wherein the base acts as a reference point to establish the spatial positioning and orientation of the surrounding objects and surfaces within the 360 environment.

9. The method as claimed in claim 6, wherein performing the texture mapping further comprises:
   performing a UV unwrapping of the 3D mesh structure to generate the UV map, wherein each vertex of the 3D mesh structure is assigned a UV coordinate, which corresponds to a specific position on the UV map;
   performing the texture mapping of the 360-degree image onto the 3D mesh based on corresponding UV coordinates.

10. The method as claimed in claim 6, wherein the 360-degree image is received as a textual data, and wherein the method further comprises transmitting the rendered 3D environment in textual data format to the user device.

11. The method as claimed in claim 6, wherein the method comprises providing the rendered 3D environment to a plurality of user devices having different operating systems in a common file format.

* * * * *